United States Patent
Toomajian

(10) Patent No.: US 12,420,263 B2
(45) Date of Patent: Sep. 23, 2025

(54) PLASMA GENERATION OF SORBENT BEDS

(71) Applicant: MagPlasma, Inc., Troy, MI (US)

(72) Inventor: Martin E Toomajian, Brighton, MI (US)

(73) Assignee: MAGPLASMA, INC, Troy, MI (US)

( * ) Notice: Subject to any disclaimer, the term of this patent is extended or adjusted under 35 U.S.C. 154(b) by 746 days.

(21) Appl. No.: 17/663,934

(22) Filed: May 18, 2022

(65) Prior Publication Data

US 2023/0372898 A1 Nov. 23, 2023

(51) Int. Cl.
*B01J 20/34* (2006.01)
*B01J 20/28* (2006.01)

(52) U.S. Cl.
CPC ..... *B01J 20/3433* (2013.01); *B01J 20/28019* (2013.01); *B01J 20/3441* (2013.01); *B01J 20/3466* (2013.01)

(58) Field of Classification Search
CPC .............. B01J 20/3433; B01J 20/28019; B01J 20/3431; B01J 20/3466
See application file for complete search history.

(56) References Cited

U.S. PATENT DOCUMENTS

| | | | |
|---|---|---|---|
| 9,754,733 B2 * | 9/2017 | Fan | ........................ C01B 32/366 |
| 2019/0366298 A1 | 12/2019 | Fan et al. | |
| 2020/0335311 A1 | 10/2020 | Fan et al. | |
| 2021/0322606 A1 * | 10/2021 | Toomajian | ........ H01J 37/32715 |

OTHER PUBLICATIONS

SL Series 10-1200W High Voltage Power Supplies_Spellman catalog_ downloaded_Apr. 20, 2025.*
Unpublished U.S. Appl. No. 17/227,347 filed Apr. 11, 2021, Toomajian et al.
Inactivation of airborne viruses using a packed bed non-thermal plasma reactor. T Xia et al 2019 J. Phys. D: Appl. Phys. 52 255201.

* cited by examiner

*Primary Examiner* — Yong L Chu
(74) *Attorney, Agent, or Firm* — John A. Miller; Shumaker, Loop & Kendrick, LLP

(57) ABSTRACT

A device for regenerating materials using a plasma field. The device includes a flow unit configured to flow a gas or a liquid and a plasma unit coupled to the flow unit and including a plurality of electrodes and a sorbent bed having a sorbent material. The plasma unit is configured to receive the flow of the gas or liquid from the flow unit so that the gas or liquid flows through the sorbent material and a predetermined chemical species in the gas or liquid is adsorbed or absorbed by the sorbent material. The device also includes a power source providing a power signal to one or more of the electrodes. The electrodes are configured so that the power signal generates a plasma field in the sorbent material that causes the adsorbed or absorbed chemical species to desorb from the sorbent material.

13 Claims, 2 Drawing Sheets

PLASMA GENERATION OF SORBENT BEDS

BACKGROUND

Field

This disclosure relates generally to a device for regenerating materials and, more particularly, to a device for regenerating materials using a plasma field.

Discussion of the Related Art

Current state-of-the-art chemical species adsorption and material regeneration is performed by temperature swing adsorption/desorption (TSA) systems or pressure swing adsorption/desorption (PSA) systems or a combination of both. In both TSA and PSA, a chemical species, such as water vapor, carbon dioxide, etc., is adsorbed onto the surface of a sorbent material or absorbed into the sorbent material at one temperature or pressure and then desorbed from the sorbent material by increasing the temperature or decreasing the pressure (or both) of the material. More specifically, in a TSA system, the temperature of the unit containing the sorbent material is lowered to increase chemical species adsorption onto/into the sorbent material. To regenerate the sorbent material, i.e., cycle it for reuse, the temperature is increased, which causes the chemical species to desorb from the material and open the material for a new cycle of adsorption. In a PSA system, the pressure of the unit containing the sorbent material is increased to increase chemical species adsorption onto/into the sorbent material. To regenerate the sorbent material, the pressure is decreased, which causes the chemical species to desorb from the material and open the material for a new cycle of adsorption.

Although TSA and PSA regeneration have been shown to be effective for regenerating sorbent materials, a significant amount of energy and time is required for both TSA and PSA regeneration.

SUMMARY

The following discussion discloses and describes a device for regenerating materials using a plasma field. The device includes a flow unit configured to flow a gas or a liquid and a plasma unit coupled to the flow unit and including a plurality of electrodes and a sorbent bed having a sorbent material. The plasma unit is configured to receive the flow of the gas or liquid from the flow unit so that the gas or liquid flows through the sorbent material and a predetermined chemical species in the gas or liquid is adsorbed or absorbed by the sorbent material. The device also includes a power source providing a power signal to one or more of the electrodes. The electrodes are configured so that the power signal generates a plasma field in the sorbent material that causes the adsorbed or absorbed chemical species to desorb from the sorbent material.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a sorbent device for regenerating materials using a plasma field is merely exemplary in nature, and is in no way intended to limit the disclosure or its applications or uses.

As will be discussed in detail below, this disclosure proposes regenerating materials using a plasma field. Plasma field regeneration of a chemical species acts similarly to TSA and PSA regeneration, but uses plasma energy to replace thermal energy or pressure change to desorb the chemical species from the sorbent material, where the temperature and pressure of the sorbent material is not changed. The plasma is generated by ionizing a material, such as air, using an electric field. The chemical species adsorbs onto the surface of the sorbent material or is absorbed into the material at a set temperature and pressure, which is independent of the process. To regenerate the sorbent material for reuse, a plasma field is formed around the sorbent material, which imparts energy into the adsorbed/absorbed chemical species and causes it to desorb from the sorbent material and open the material for reuse.

Figure 1:
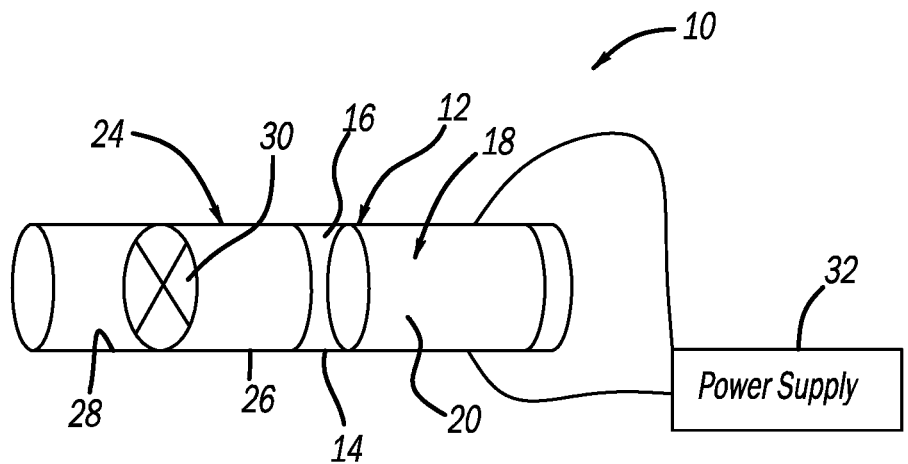
FIG. 1 is an isometric view of a sorbent device having a plasma unit that desorbs a material from a sorbent bed using a plasma field.

FIG. 1 is an isometric view of a device 10 for adsorbing/absorbing and desorbing a chemical species. In this non-limiting embodiment, the device 10 removes water vapor from a flow of air. The device 10 includes a plasma unit 12 having a cylindrical tube 14 defining a chamber 16 in which is positioned a sorbent bed 18 that includes a sorbent material 20, for example, a mass of beads or other particles. The sorbent material 20 would be selected for the particular chemical species being adsorbed/absorbed and for the particular application. For example, the sorbent material 20 can be a solid or porous material, such as biochar, carbon, molecular sieves, silicas and silica gels, alumina, and other sorbent materials commonly used to separate impurities from gases or liquids. The device 10 also includes a blower unit 24 also having a cylindrical tube 26 defining a chamber 28, where the blower unit 24 is suitably coupled to the plasma unit 12 so that the chambers 16 and 28 align with each other. The unit 28 includes a fan 30 that draws or pushes air, or another gas or liquid, through the chambers 16 and 28 so that the air flows through the sorbent bed 18 and through and around the material 20 in the bed 18, where the material 20 adsorbs or absorbs the chemical species in the air flow, here water vapor, to provide a flow of dry air.

Once the sorbent bed 18 is saturated and needs to be regenerated for continued use, a power supply 32 provides power to electrodes (not shown in FIG. 1) that generates a plasma field in the sorbent bed 18 that desorbs the chemical species from the material 20, which is drawn away by a carrier gas or liquid before it can readsorb to be discarded. In one non-limiting embodiment, the power supply 32 is a high voltage step up transformer power supply that steps up 10 volts to 12 kilovolts, however, the power supply 32 can provide other high voltages, such as 6-100 kilovolts, where the higher the voltage the more intense the plasma field. The plasma field energy causes the weak attraction forces in the physically adsorbed species to break, which separates the chemical species from the material 20. For more strongly adsorbed species as sometimes seen in chemical adsorption, the plasma field energy can be sufficient to break the chemical bonds and release the chemical species into the carrier gas or liquid to remove them from the device 10.

Figure 2:
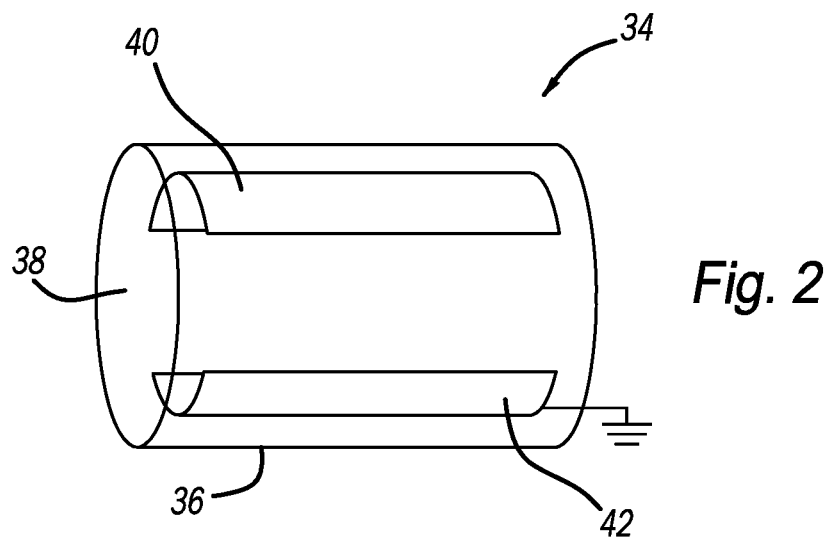
FIG. 2 is an isometric view of a plasma unit that can be used in the device shown in FIG. 1.

FIG. 2 is an isometric view of a plasma unit 34 that can be used as the plasma unit 12 in the device 10. The plasma unit 34 includes a cylindrical outer housing 36 defining a chamber 38. A pair of spaced apart semicircular electrodes 40 and 42 are positioned in the chamber 38, where one of the electrodes 40 or 42 would receive the power signal from the power supply 32 and the other electrode 40 or 42 would be grounded so that a plasma field is generated between the electrodes 40 and 42. The electrodes 40 and 42 can be secured within the chamber 38 in any suitable manner, such as being secured to an inside surface or an outside surface of the housing 36. The sorbent material 20 would be positioned in the chamber 38 between the electrodes 40 and 42.

Figure 3:
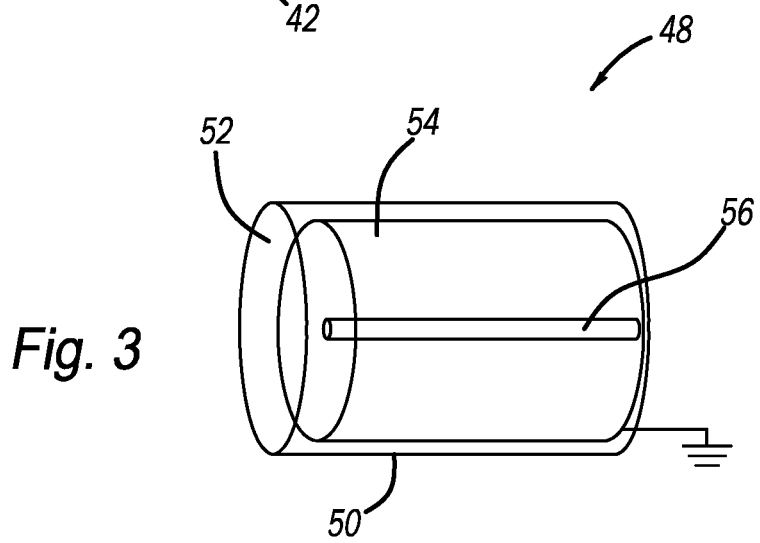
FIG. 3 is an isometric view of another plasma unit that can be used in the device shown in FIG. 1.

FIG. 3 is an isometric view of another plasma unit 48 that can be used as the plasma unit 12 in the device 10. The plasma unit 48 includes a cylindrical outer housing 50 defining a chamber 52. An outer cylindrical electrode 54 is position on or adjacent to an inside surface, or an outside surface of the housing 50 and a rod electrode 56 is positioned along a central axis of the electrode 54, as shown. One of the electrodes 54 or 56 would receive the power signal from the power supply 32 and the other electrode 54 or 56 would be grounded so that a plasma field is generated between the electrodes 54 and 56. The electrodes 54 and 56 can be secured within the chamber 38 or on the housing 50 in any suitable manner. The sorbent material 20 would be positioned in the electrode 54 and around the electrode 56.

Figure 4:
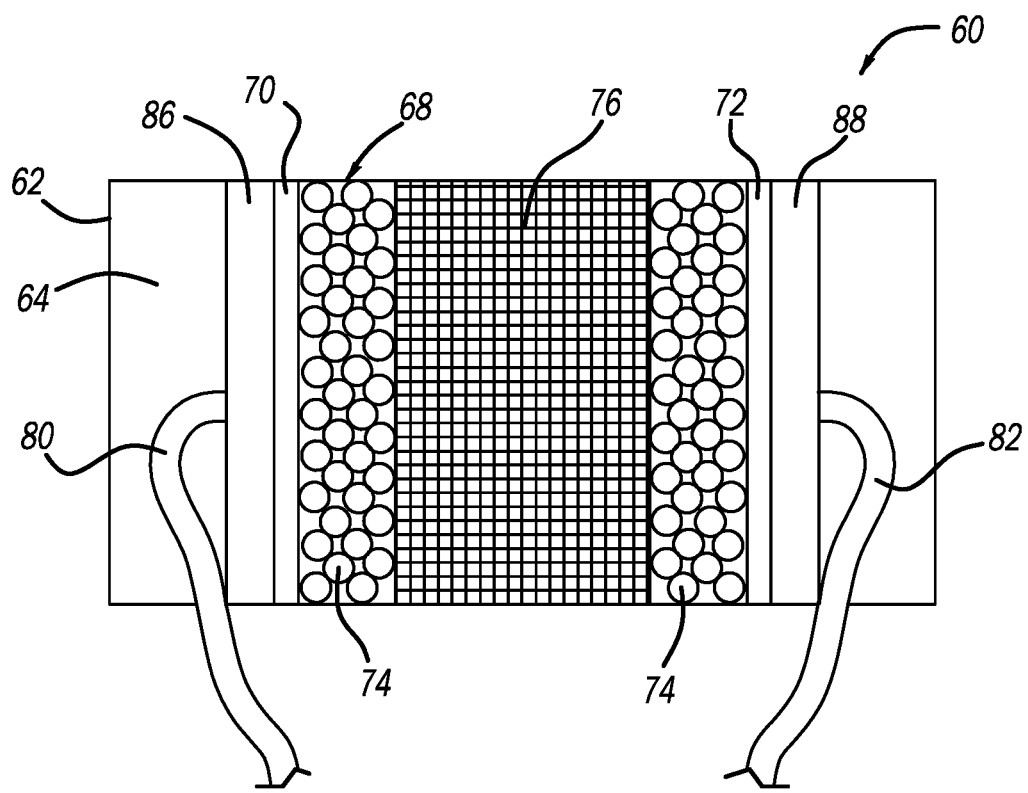
FIG. 4 is an isometric view of another plasma unit that can be used in the device shown in FIG. 1.
Figure 5:
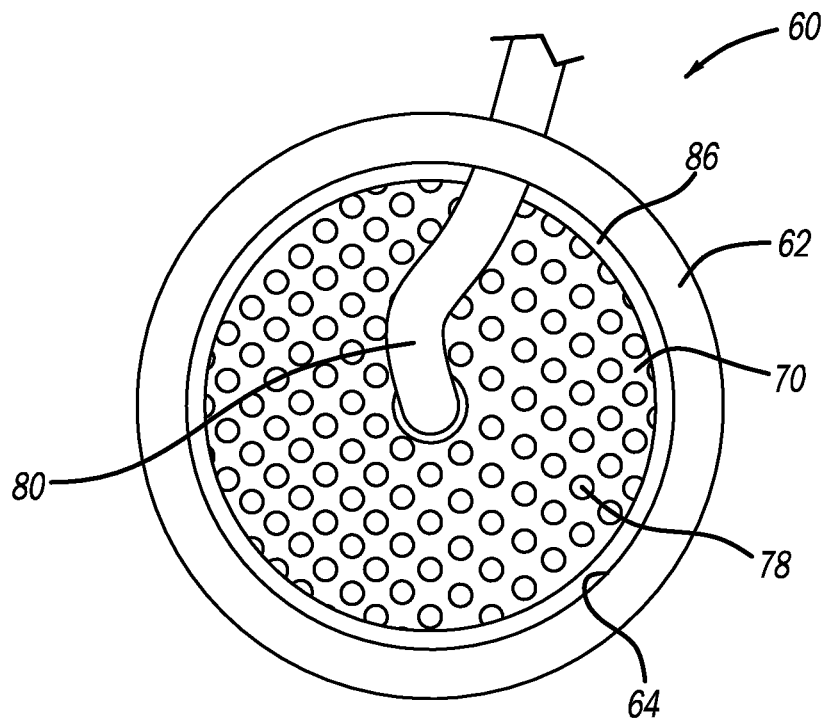
FIG. 5 is an end view of the unit shown in FIG. 4.

FIG. 4 is a side view and FIG. 5 is an end view of a plasma unit 60 that can replace the plasma unit 12 in the device 10. The unit 60 includes an outer cylindrical tube 62 defining a chamber 64 therein, where the tube 62 is made of a non-conducting material, such as polyvinyl chloride, or other plastic material, in this non-limiting embodiment. The unit 60 also includes a sorbent bed 68 positioned between opposing end metal electrodes 70 and 72 at a center location of the chamber 64. In this non-limiting embodiment, the sorbent bed 68 includes packed spherical beads 74 having a certain diameter, where other diameters and mixed diameters will be suitable for other applications. The beads 74 can be made of any suitable material, such as powdered carbon, and can have other shapes or mixed shapes that are conducive to allow airflow therethrough. A center band electrode 76 is formed around an inner wall or outside of the tube 62 between the end electrodes 70 and 72. The end electrodes 70 and 72 include perforated holes 78 that allow airflow through the electrodes 70 and 72 and through the sorbent bed 68. A wire 80 is electrically coupled to the electrode 70 and the power supply 32, and a wire 82 is electrically coupled to the electrode 72 and the power supply 32. In this non-limiting embodiment, the end electrodes 70 and 72 are grounded and the center electrode 76 is energized, although that can be reversed. In this non-limiting embodiment, a pair of rings 86 and 88 are positioned against the electrodes 70 and 72, respectively, to help hold the sorbent bed 68 in place. However, other components can be used to hold the sorbent bed 68 in place, such as glue, pins, etc.

The discussion above talks about the power supply 32 being a high voltage power supply to generate a high voltage plasma field. In an alternate embodiment, the power supply 32 can be an RF generator that uses an RF signal to generate the plasma field. In that embodiment, the plasma unit 12 would need to be under vacuum.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A device comprising:
   a flow unit configured to flow a gas or a liquid;
   a plasma unit coupled to the flow unit and including a plurality of electrodes and a sorbent bed having a sorbent material, said plasma unit being configured to receive the flow of the gas or liquid from the flow unit so that the gas or liquid flows through the sorbent material and a predetermined chemical species in the gas or liquid is adsorbed or absorbed by the sorbent material, wherein the plurality of electrodes include a first end electrode positioned at one end of the sorbent bed, a second end electrode positioned at another end of the sorbent bed and a center band electrode positioned around the sorbent bed between the first and second end electrodes, and wherein the first and second end electrodes include a series of holes that allow the gas or liquid to flow therethrough; and
   a power source providing a power signal to one or more of the electrodes, said plurality of electrodes being configured so that the power signal generates a plasma field in the sorbent material that causes the adsorbed or absorbed chemical species to desorb from the sorbent material.

2. The device according to claim 1 wherein the plasma unit includes an outer cylindrical housing, the first and second end electrodes are round and positioned within the housing, the sorbent bed is positioned within the housing between the first and second end electrodes and the center electrode is positioned on the housing.

3. The device according to claim 2 wherein the plasma unit includes a first support ring positioned within the housing against the first end electrode opposite to the sorbent bed and a second support ring positioned within the housing against the second end electrode opposite to the sorbent bed.

4. The device according to claim 1 wherein the flow unit includes a fan for drawing or pushing the gas or liquid through the plasma unit.

5. The device according to claim 1 wherein the sorbent material is a mass of spherical beads.

6. The device according to claim 1 wherein the gas or liquid is air and the chemical species is water vapor in the air.

7. The device according to claim 1 wherein the power source provides a voltage power signal in the range of 6-100 kilovolts.

8. A device comprising:
   a flow unit configured to flow a gas or a liquid;
   a plasma unit coupled to the flow unit and including a sorbent bed having a sorbent material, said plasma unit further including a first end electrode positioned at one end of the sorbent bed, a second end electrode positioned at another end of the sorbent bed and a center band electrode positioned around the sorbent bed between the first and second end electrodes, said first and second end electrodes including a series of holes, said plasma unit being configured to receive the flow of the gas or liquid from the flow unit so that the gas or liquid flows through the first and second end electrodes and the sorbent material and a predetermined chemical species in the gas or liquid is adsorbed or absorbed by the sorbent material; and a power source providing a voltage power signal in the range of 6-100 kilovolts to the first and second end electrodes or the center electrode so as to generate a plasma field in the sorbent material that causes the adsorbed or absorbed chemical species to desorb from the sorbent material.

9. The device according to claim 8 wherein the plasma unit includes an outer cylindrical housing, the first and second end electrodes are round and positioned within the housing, the sorbent bed is positioned within the housing between the first and second end electrodes and the center electrode is positioned on or in the housing.

10. The device according to claim 9 wherein the plasma unit includes a first support ring positioned within the housing against the first end electrode opposite to the sorbent bed and a second support ring positioned within the housing against the second end electrode opposite to the sorbent bed.

11. The device according to claim 8 wherein the flow unit includes a fan for drawing or pushing the gas or liquid through the plasma unit.

12. The device according to claim 8 wherein the sorbent material is a mass of spherical beads.

13. The device according to claim 8 wherein the gas or liquid is air and the chemical species is water vapor in the air.

* * * * *